US012712765B2

(12) United States Patent
Le Magoarou et al.

(10) Patent No.: US 12,712,765 B2
(45) Date of Patent: Aug. 18, 2026

(54) METHOD AND DEVICE FOR ESTIMATING A CHANNEL, AND ASSOCIATED COMPUTER PROGRAM

(71) Applicant: FONDATION B-COM, Cesson-Sévigné (FR)

(72) Inventors: Luc Le Magoarou, Rennes (FR); Stéphane Paquelet, Rennes (FR)

(73) Assignee: FONDATION B-COM, Cesson-Sévigné (FR)

( * ) Notice: Subject to any disclaimer, the term of this patent is extended or adjusted under 35 U.S.C. 154(b) by 967 days.

(21) Appl. No.: 17/921,481

(22) PCT Filed: Apr. 14, 2021

(86) PCT No.: PCT/EP2021/059711
§ 371 (c)(1),
(2) Date: Oct. 26, 2022

(87) PCT Pub. No.: WO2021/219383
PCT Pub. Date: Nov. 4, 2021

(65) Prior Publication Data

US 2023/0188385 A1 Jun. 15, 2023

(30) Foreign Application Priority Data

Apr. 28, 2020 (FR) ........................................ 2004203

(51) Int. Cl.
*H04L 25/02* (2006.01)
*G06N 3/08* (2023.01)

(52) U.S. Cl.
CPC .......... *H04L 25/0254* (2013.01); *G06N 3/08* (2013.01)

(58) Field of Classification Search
CPC .............................. H04L 25/0254; G06N 3/08
See application file for complete search history.

(56) References Cited

FOREIGN PATENT DOCUMENTS

WO WO-2020028382 A1 * 2/2020 ............ G16H 50/20
WO WO-2021203373 A1 * 10/2021 .............. H04L 5/00

OTHER PUBLICATIONS

He, Hengtao et al., "Deep Learning-Based Channel Estimation for Beamspace mmWave Massive MIMO Systems", May 1, 2018, IEEE, p. 852-855 (Year: 2018).*

(Continued)

*Primary Examiner* — Haimei Jiang
*Assistant Examiner* — Thomas Bernard Lane
(74) *Attorney, Agent, or Firm* — NIXON & VANDERHYE

(57) ABSTRACT

Disclosed is a device for estimating a channel for communication system, which includes: a construction module designed to construct, on the basis of a physical model, a set of vectors) associated with a plurality of values of at least one parameter; an initialization module designed to initialize, as a function of the constructed vectors), columns of weighting coefficients defining at least a part of an artificial neural network; an application module designed to apply, as an input to the part of the artificial neural network, a vector determined as a function of noisy values so as to produce as an output a vector including estimated values; and a module for updating the weighting coefficients of the part of the artificial neural network by a learning technique. An associated method and computer program are also described.

17 Claims, 2 Drawing Sheets

(56) References Cited

OTHER PUBLICATIONS

Figure 1:
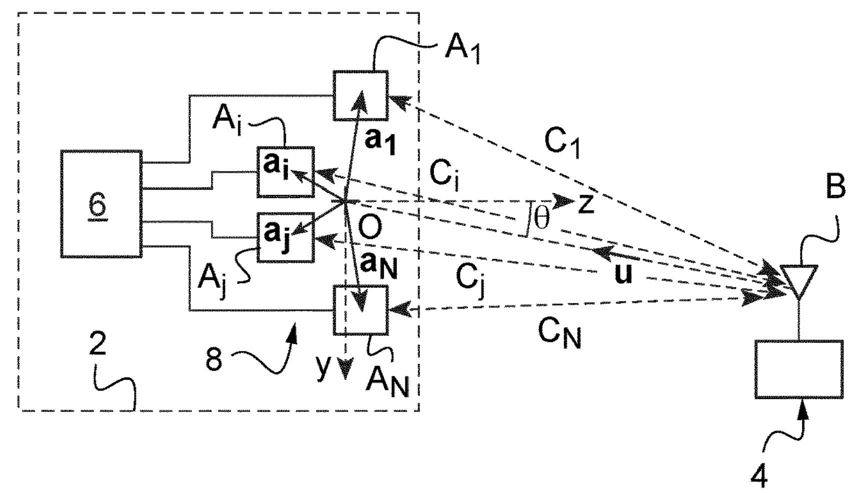

International Search Report for PCT/EP2021/059711, mailed May 4, 2021, 3 pages.
Written Opinion of the ISA for PCT/EP2021/059711, mailed May 4, 2021, 5 Pages
Bhatia et al., "Deep Learning Explorations in Wireless Channel Encoders" 2019 Photon/CS & Electromagnet/CS Research Symposium—F'all (Piers-Fall), IEEE, Dec. 17, 2019 (Dec. 17, 2019), pp. 2806-2811.
Thakkar et al., "Deep Learning and Channel Estimation" 2020 6th Internatioanl Conference on Advanced Computing and Communications Systems (ICACCS), IEEE, Mar. 6, 2020 (Mar. 6, 2020), pp. 745-751.
L. Bottou, "Large-scale machine learning with stochastic gradient descent", Proceedings of COMPSTAT'2010, 2010, 177-186.
Mallat et al., "Pursuits with Time-Frequency Dictionaries", IEEE Transactions on Signal Processing, vol. 41, No. 12, Dec. 1993, pp. 3397-33415.
He et al., "Deep Learning-based Channel Estimation for Beamspace mmWave Massive MIMO Systems", IEEE Wireless Communication Letters, vol. 7, No. 5, pp. 852-855, 2018
Leung et al. "The complex backpropagation algorithm", IEEE Transactions on signal processing, 39(9), pp. 1991, 2101-2104
Makhzani et a1., k-Sparse Autoencoders, International Conference on Learning Representations, ICLR 2014, 9 pages.

* cited by examiner

METHOD AND DEVICE FOR ESTIMATING A CHANNEL, AND ASSOCIATED COMPUTER PROGRAM

This application is the U.S. national phase of International Application No. PCT/EP2021/059711 filed Apr. 14, 2021, which designated the U.S. and claims priority to FR Patent Application No. 2004203 filed Apr. 28, 2020, the entire contents of each of which are hereby incorporated by reference.

TECHNICAL FIELD OF THE INVENTION

The present invention relates to the technical field of telecommunication.

More particularly, it relates to channel estimation method and device, as well as an associated program.

STATE OF THE ART

In order to optimize the transmission of data in a communication system, it is known to implement a channel estimation method aiming to have a better knowledge of the current state of the communication channels used by the communication system.

For that purpose, pilot sequences are for example transmitted in the different communication channels. After receipt, these pilot sequences may be processed in such a way as to deduce therefrom values respectively representative of the transmission through the communication channels.

The article "*Deep Learning-based Channel Estimation for Beamspace mm Wave Massive MIMO Systems*", by Hengtao He, Chao-Kai Wen, Shi Jin and Geoffrey Ye Li, in IEEE Wireless Communication Letters, vol. 7, n °5, pp. 852-855, 2018 proposes to use for that purpose deep learning techniques for estimating a channel of a communication system of the MIMO ("Multiple-Input Multiple-Output") type.

DISCLOSURE OF THE INVENTION

In this context, the present invention proposes a method for estimating a channel in a communication system comprising a plurality of communication channels, from a plurality of noisy values respectively representative of the transmission through said communication channels, comprising the following steps:

- based on a physical model of the communication system having at least one parameter, constructing a set of vectors associated with a plurality of values of said at least one parameter, a vector associated with a given value of said at least on parameter comprising values respectively representative of the transmission through said communication channels according to said physical model for said given value of said at least one parameter;
- initializing, as a function of the constructed vectors, columns of weighting coefficients defining a part at least of an artificial neural network, said part of artificial neural network being configured to determine the column of weighting coefficients that is the best correlated with a vector received as an input of the artificial neural network and to produce as an output a vector that is colinear with the best correlated column;
- applying, as an input of said part of the artificial neural network, a vector determined as a function of said noisy values in such a way as to produce as an output of the artificial neural network a vector comprising estimated values respectively representative of the transmission through said communication channels;
- updating the weighting coefficients of said part of the artificial neural network by a learning technique reducing a cost function that increases as a function a distance between the vector applied as an input of the artificial neural network and the vector produced as an output of the artificial neural network.

The use of an artificial neural network whose weighting coefficients (or weights) are defined by means of a physical model of the communication system makes it possible to obtain a satisfying channel estimation even without previous learning phase. The updating of the weighting coefficients during the operation further makes it possible progressively improve the estimation performed.

Other non-limiting and advantageous features of the method according to the invention, taken individually or according to all the technically possible combinations, are the following:

- the method comprises a plurality of successive steps of application of vector as an input of said part of artificial neural network and, for each successive step of application, a corresponding step of updating the weighting coefficients by said learning technique;
- at the initialization step, each column of weighting coefficients is initialized with a vector product of a transform matrix for transformation from a communication channel domain (or domain defined by antennas of the communication system) to a dual angular domain, with one vector of said set;
- the vector applied as an input is obtained by normalizing a vector comprising said noisy values and multiplying the transform matrix by the normalized vector;
- at the initialization step, each column of weighting coefficients is initialized with a vector of said set and/or the vector applied as an input comprises said noisy values;
- the artificial neural network comprises at least another part configured to receive as an input a vector obtained by difference between the vector applied as an input of said part of the artificial neural network and the vector produced as an output of said part of the artificial neural network;
- this other part of the artificial neural network comprises columns of other weighting coefficients and is configured to determine the column of said other weighting coefficients that is the best correlated with the vector received as an input of this other part of the artificial neural network and to produce a vector that is colinear with the best correlated column of said other coefficients;
- said physical model is based on a plurality of parameters;
- the set of constructed vectors comprises vectors respectively associated with a plurality of distinct tuples of values of said parameters;
- the parameter is an angle with respect to an array of antennas of the communication system;
- the constructed vectors comprise at least one value representative of the transmission and obtained as a function of a value of said angle;
- said noisy values are obtained by receipt of pilot sequences via the communication channels and processing of said received pilot sequences.

The invention also proposes a channel estimation device for a communication system comprising a plurality of communication channels, comprising:

- a construction module adapted to construct, based on a physical model of the communication system having at least one parameter, a set of vectors associated with a plurality of values of said at least one parameter in such a way that a vector associated with a given value of said at least one parameter comprise values respectively representative of the transmission through said communication channels according to said physical model for said given value of said at least one parameter;
- an initialization module adapted to initialize, as a function of the constructed vectors, columns of weighting coefficients defining a part at least of an artificial neural network, said part of the artificial neural network being configured to determine the column of weighting coefficients that is the best correlated with a vector received as an input of the artificial neural network and to produce as an output a vector that is colinear with the best correlated column;
- an application module adapted to apply, as an input of said part of the artificial neural network, a vector determined as a function of noisy values respectively representative of the transmission through said communication channels, in such a way as to produce as an output of the artificial neural network a vector comprising estimated values respectively representative of the transmission through said communication channels;
- a module for updating the weighting coefficients of said part of the artificial neural network by a learning technique reducing a cost function that increases as a function a distance between the vector applied as an input of the artificial neural network and the vector produced as an output of the artificial neural network.

This channel estimation device is for example included in a communication unit such as a base station of a mobile phone network, as will be described hereinafter.

The invention finally proposes a computer program comprising instructions executable by a processor (for example, a processor of the above-mentioned communication unit) and adapted to implement a method as proposed hereinabove when these instructions are executed by the processor.

Of course, the different features, alternatives and embodiments of the invention can be associated with each other according to various combinations, insofar as they are not mutually incompatible or exclusive.

DETAILED DESCRIPTION OF THE INVENTION

Figure 2:
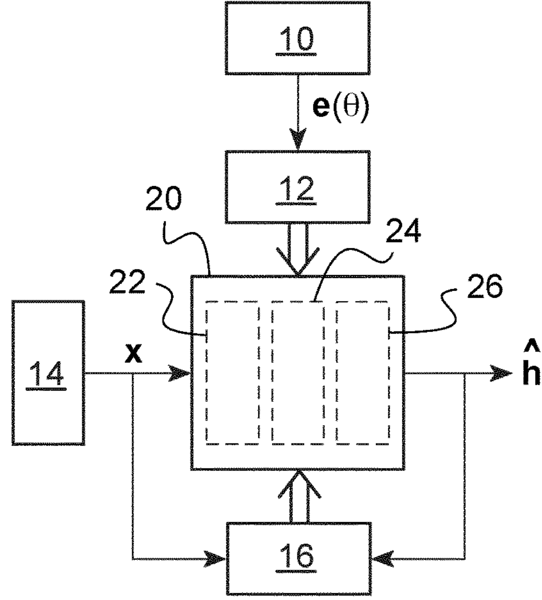
Figure 3:
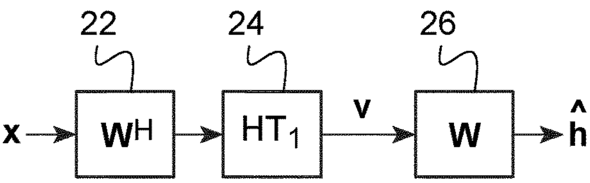
Figure 4:
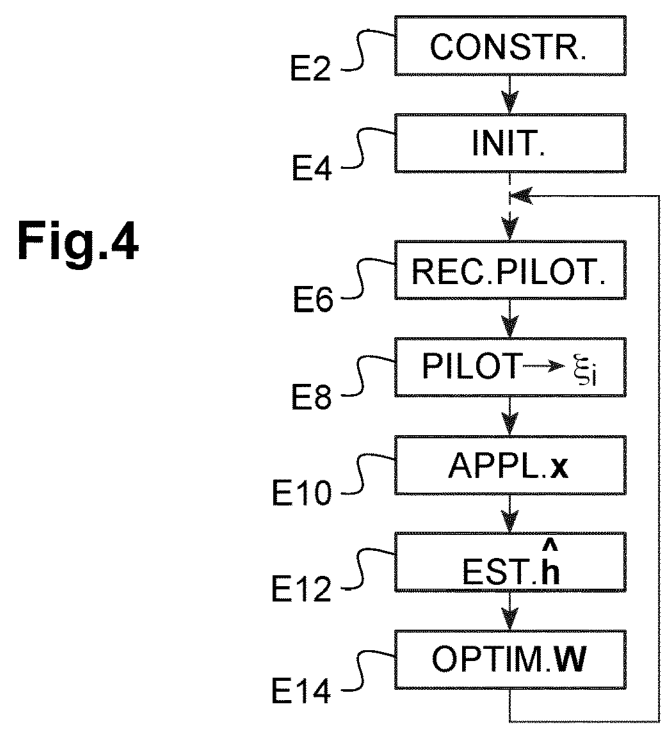
Figure 5:
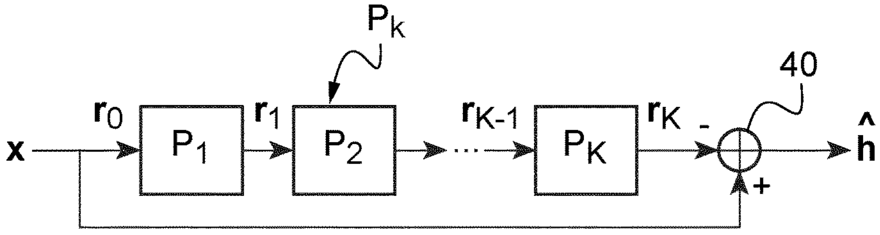
Figure 6:
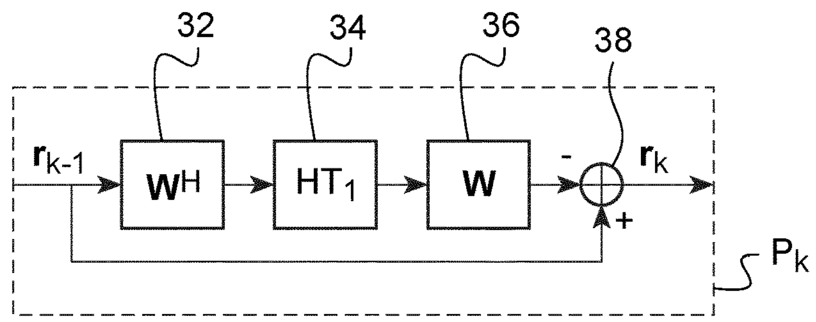

Moreover, various other features of the invention will be apparent from the appended description made with reference to the drawings that illustrate non-limiting embodiments of the invention, and wherein:

FIG. 1 schematically shows a communication system;

FIG. 2 functionally illustrates a channel estimation device according to an exemplary embodiment of the invention;

FIG. 3 schematically shows an artificial neural network operable in the channel estimation device of FIG. 2;

FIG. 4 is a flowchart showing an example of channel estimation method according to the invention;

FIG. 5 schematically shows a possible alternative for the above-mentioned artificial neural network; and FIG. 6 shows in detail a part of the artificial neural network of FIG. 5.

FIG. 1 schematically shows a communication system in which the invention can be implemented.

This communication system comprises a communication unit 2 and an electronic device 4.

The communication unit 2 comprises a control unit 6 and a plurality of antennas $A_1$, $A_i$, $A_j$, $A_N$ forming an array of antennas 8 of centroid O. The number of antennas $A_1$, $A_i$, $A_j$, $A_N$ of the array of antennas 8 is here equal to N.

The control unit 6 is connected to each of the antennas $A_1$, $A_i$, $A_j$, $A_N$ in such a way as to receive signals representative of electromagnetic signals received by each of the antennas $A_1$, $A_i$, $A_j$, $A_N$. The control unit 6 can also control the transmission of electromagnetic signals by each of the antennas $A_1$, $A_i$, $A_j$, $A_N$.

The electronic device 4 includes an antenna B, by means of which the electronic device 4 can transmit electromagnetic signals (towards in particular the communication unit 2), in particular pilot sequences as described hereinafter.

The communication system could comprise other electronic devices provided with at least one antenna and hence capable of exchanging electromagnetic signals with the communication unit 2. We are in this case in a situation of the type MU-MIMO ("Multi User—Multiple-Input Multiple-Output") system. A single electronic device 4 is however shown in FIG. 1 to simplify the present disclosure.

In practice, the communication unit 2 is for example a base station of a mobile phone network. The electronic device 4 is then for example in this case a mobile terminal.

The communication system of FIG. 1 comprises a plurality of communication channels $C_1$, $C_i$, $C_j$, $C_N$, here between each of the antennas $A_1$, $A_i$, $A_j$, $A_N$ of the communication unit 2 and the antenna B of the electronic device 4.

FIG. 2 functionally illustrates a part of the control unit 6 that forms a channel estimation device according to an exemplary embodiment of the invention.

Each of the different modules described hereinafter is for example made by means of computer program instructions adapted to implement the concern module when these instructions are executed by a processor of the control unit 6.

The channel estimation device comprises a construction module 10 that uses a physical model of the communication system having at least one parameter.

This physical model here models the transmission of the electromagnetic signals from the antenna B of the electronic device 4 to the array of antennas 8 by a plane wave propagated (in direct line) along a direction connecting the antenna B and the centroid O, or direction of arrival, directed according to a unit vector u.

It is moreover considered that the array of antennas 8 is a Uniform Linear Array (ULA).

The construction module 10 can thus determine, based on this physical model, values respectively representative of the transmission through the communication channels $C_1$, $C_i$, $C_j$, $C_N$.

In the case of the above-contemplated model, the transmission through each channel $C_i$ can be represented by the channel value $c_i$ defined as follows:

$$c_i = g_i e^{-j\frac{2\pi}{\lambda} a_i . u} = g_i e^{-j\frac{2\pi}{\lambda}(a_i)_y . sin\theta}$$

where $g_i$ is the complex gain of the antenna $A_i$, $\lambda$ is the wavelength of the electromagnetic wave used, $a_i$ is the vector designating the position of the antenna A with respect to the centroid O, $(a_i)_y$ is the component of the vector $a_i$ along the y-axis (vertical axis in FIG. 1) and $\theta$ is the azimuth angle formed, in the plane (O,z,y), by the direction of arrival and the z-axis.

In the case of the uniform linear array contemplated herein, we have: $g_i=1$ for i from 1 to N, and the azimuth angle θ is thus used as a parameter of the physical model.

Based on this physical model, the construction module 10 can construct a set of vectors e(θ) respectively associated with a plurality of values of the parameter, a vector e(θ) associated with a given value θ comprising the values $c_i(\theta)$ respectively representative of the transmission through said communication channels $C_i$ according to said physical model for this given value θ of the parameter: $e(\theta)=(c_1(\theta), c_i(\theta), c_j(\theta), \ldots, c_N(\theta))^T$, where $^T$ is the transpose operator. Thereafter, L denotes the number of different values considered for the parameter (or, when several parameters are used, the number of tuples of values considered). This number L thus also corresponds to the number of vectors e(θ) in the set of vectors. The number L is for example comprised between 10.N and 100.N vectors (N being as hereinabove the number of antennas of the array of antennas 8) or, in practice, between 500 an 10,000.

The channel estimation device also comprises an initialization module 12 adapted to initialize weighting coefficients (or weights) of an artificial neural network 20 as a function of the vectors e(θ) constructed by the construction module.

More precisely, the artificial neural network 20 is partly defined by columns $w_i$ of weighting coefficients, and each column $w_i$ of weighting coefficients is initialized based on a constructed vector e(θ) (associated with a particular value θ of the parameter of the physical model, as already indicated). Different possibilities for the initialization of a column $w_i$ of weighting coefficients based on a constructed vector e(θ) are described in the following.

The channel estimation device 20 also comprises the just-mentioned artificial neural network 20.

This artificial neural network 20 (or a part at least of the latter in certain possible alternatives, as described hereinafter with reference to FIGS. 5 and 6) is configured to determine the column y of weighting coefficients that is the best correlated with a vector x received as an input of the artificial neural network 20 and to produce as an output a vector $\hat{h}$ that is colinear with the best correlated column. In other words, we have:

$$Y = \mathrm{argmax}_{wi}\left|W_i^H X\right|$$

$$\hat{h} = YY^{H}X$$

where $^H$ is the "conjugate transpose" operator and |z| is the module of the complex number z (by equating the column $w_i$ of weighting coefficients to the vector formed of the elements of this column $w_i$).

For that purpose, the artificial neural network 20 is for example a k-sparse autoencoder as described in the article "*K-sparse autoencoders*", by A. Makhzani and B.Frey, arXiv preprint, arXiv:1312.5663, 2013, here with a sparse parameter k equal to 1.

FIG. 3 schematically shows an artificial neural network of this type.

In this figure, W represents a matrix formed by the columns $w_i$ of weighting coefficients ($W\in\mathbb{C}^{N\times L}$).

The artificial neural network 20 here includes a first layer 22 that applies to the vector x received as an input of the artificial neural network 20 a multiplication (on the left) by the matrix $W^H$. In other words, the first layer 22 produces as an output the vector (with L elements): $W^Hx$.

According to a possible embodiment of the artificial neural network 20, the first layer 22 can further add (to the result of the multiplication by the matrix $W^H$) a vector $b_1$ having L elements. In this case, the first layer 22 produces as an output the vector (with L elements): $W^Hx+b_1$. In practice, the vector $b_1$ is for example initialized (here by the initialization module 12) by setting all the elements thereof at 0 (null value); the elements of the vector $b_1$ are then liable to evolve during phases of learning by the updating module 16, as described hereinafter.

The artificial neural network 20 further includes a second layer 24 that keeps only the element (or coefficient) of largest modulus in the vector received from the first layer 22 (that is to say in the vector $W^Hx$) and cancels all the other elements of this same vector. The operator implemented in this second layer 24 is generally called $HT_1$ (for "*Hard Thresholding*" with sparse 1).

The second layer 24 thus produces as an output a vector v having L elements with L−1 null elements and one element corresponding to the element of maximum module in the vector received from the first layer 22.

The artificial neural network 20 finally includes a third layer 26 that applies to the vector v received from the second layer 24 a multiplication (on the left) by the matrix W. In other words, the third layer 26 produces as an output the vector Wv.

In the example described herein, the output of the third layer 26 corresponds to the output of the artificial neural network 20 and thus: $\hat{h}=Wv$.

According to a possible embodiment of the artificial neural network 20, the third layer 26 can further add (to the result of the multiplication by the matrix W) a vector $b_2$ having N elements. In this case, the third layer 26 produces as an output the vector (having N elements): $Wv+b_2$. In practice, the vector $b_2$ is for example initialized (here by the initialization module 12) by setting all the elements thereof at 0 (null value); the elements of the vector $b_2$ are then liable to evolve during phases of learning by the updating module 16, as described hereinafter.

To sum up, based on a vector x received as an input, the artificial neural network 20 here produces as an output the vector $\hat{h}=WHT_1(W^Hx)$ (which is an expression of $\hat{h}$ equivalent to that given hereinabove).

For the practical implementation of this artificial neural network 20 in a calculator (for example, a computer) handling only real values, the above-mentioned complex-value vectors may be transformed into real-value vectors comprising two elements (real part and imaginary part) for each element of the concerned complex-value vector. Likewise, the real representation will be used for the matrices. Reference may for example be made for that purpose to the article "*The complex backpropagation algorithm*", by Leung, H. and Haykin, S. in IEEE Transactions on signal processing, 39(9), 2101-2104 (1991).

The channel estimation device further comprises an application module 14 adapted to apply, as an input of the artificial neural network 20, a vector x determined as a function of noisy values respectively representative of the transmission through the different communication channels $C_i$, $C_i$, $C_j$, $C_N$. As explained hereinafter, these noisy values are for example obtained by receipt and processing of at least one pilot sequence transmitted by the electronic device 4.

The artificial neural network 20 then produces as an output the vector h that thus comprises estimated values respectively representative of the transmission through the communication channels $C_i$, $C_i$, $C_j$, $C_N$.

The channel estimation device finally comprises a module for updating 16 the weighting coefficients (that is to say the elements of the columns $w_i$ of weighting coefficients, or also the coefficients of the matrix W) by a learning technique reducing a cost function f that increases as a function a distance d between the vector x applied as an input of the artificial neural network 20 and the vector $\hat{h}$ produced as an output of the artificial neural network 20. If vectors $b_1$ and/or $b_2$ are used within the artificial neural network 20 as mentioned hereinabove, the elements of these vectors $b_1$, $b_2$ can be simultaneously updated by the updating module 16 by this learning technique.

The distance $d=\|x-\hat{h}\|_2$ is for example used, where $\|z\|_2$ is the norm 2 (or Euclidean norm) of the vector z:

$$\|z\|_2 = \sqrt{\sum_{i=1}^{N}|z_i|^2}$$

with $z=(z_1, \ldots, z_i, \ldots, z_N)^T$.

The cost function f is for example $f(d)=0.5.d^2$.

The learning technique makes it possible to modify the coefficients (or weights) of the artificial neural network 20, that is to say, here, in practice, the coefficients of the matrix W, in order to reduce the cost function f(d). This is thus an optimization technique. A so-called "mini-batch gradient descent" technique as that described in the article "*Large-scale machine learning with stochastic gradient descent*", by L. Bottou, in Proceedings of COMPSTAT'2010, Springer 2010, pp. 177-186, may for example be used.

FIG. 4 is a flowchart that represents an example of estimation method that can be implemented in the just-described context. This method is thus implemented herein by the communication unit 2.

This method starts with a step E2 of constructing a set of vectors e(θ) respectively associated with a plurality of values θ of the parameter based on the physical model of the communication system using this parameter.

As already indicated, a vector e(θ) associated with a given value θ of the parameter comprises values $c_1(\theta)$, $c_i(\theta)$, $c_j(\theta)$, $c_N(\theta)$ respectively representative of the transmission through the communication channels $C_i$, $C_i$, $C_j$, $C_N$, said representative values $c_1(\theta)$, $c_i(\theta)$, $c_j(\theta)$, $c_N(\theta)$ being calculated according to the physical model for the given value θ of the parameter.

When the physical model uses several parameters, the set of vectors comprises vectors associated with a plurality of distinct tuples of values of these parameters, each vector comprising here again values respectively representative of the transmission through the communication channels $C_1$, $C_i$, $C_j$, $C_N$, which are calculated according to the physical model for a given tuple of values of the parameters.

The construction step E2 is here implemented by the construction module 10.

The method continues with a step E4 of initializing, as a function of the vectors e(θ) constructed at step E2, the columns $w_i$ of weighting coefficients defining in part the artificial neural network 20 (these columns $w_i$ of weighting coefficients here corresponding to the columns of the matrix W of the artificial neural network 20). Step E4 is here implemented by the initialization module 12.

According to a first embodiment, each column $w_i$ is initialized by means of a vector $e(\theta_i)$ of the set of constructed vectors (this vector $e(\theta_i)$ being associated with a particular value $\theta_i$ of the parameter of the physical model).

According to a second embodiment, each vector e(θ) of the set of constructed vectors is transposed in the dual angular domain before initialization of a column $w_i$ of weighting coefficients.

In each case, each column $w_i$ is initialized by means of the vector $Fe(\theta_i)$, where $e(\theta_i)$ is a vector of the set of constructed vectors associated with a particular value $\theta_i$ of the parameter of the physical model and F is a matrix of transformation from the communication channel domain (that is to say the antenna domain) to the dual angular domain ($F \in \mathbb{C}^{N \times N}$). In other words, the matrix F makes it possible to transform a vector comprising values respectively representative of the transmission via the different antennas $A_1$, $A_i$, $A_j$, $A_N$ of the array of antennas 8 (that is to say through the different communication channels $C_1$, $C_i$, $C_j$, $C_N$) into a vector comprising values respectively representative of the transmission for different angles with respect to the array of antennas 8.

In the present case in which the array of antennas 8 is a uniform linear array, the matrix F is a discrete Fourier transform matrix, or Vandermonde-Fourier matrix. The matrix F indeed corresponds herein to a base of steering vectors associated with the array of antennas 8. A coefficient $f_{p,q}$ in line p and column q in the matrix F is thus herein equal to:

$$f_{p,q} = \frac{1}{\sqrt{N}} e^{-j2\pi.\frac{(p-1)(q-1)}{N}}$$

In the case where the artificial neural network 20 uses vectors $b_1$ and/or $b_2$ as mentioned hereinabove, these vectors $b_1$, $b_2$ are each initialized at step E4, for example by setting their elements to the value 0 (null value).

The just-described steps E2 and E4 can in practice be implemented once, for example at the initialization or at the starting of the communication unit 6.

The following steps are on the contrary repeated and allow the progressive evolution of the artificial neural network 20, as described hereinafter.

The method thus continues with a step E6 of receiving a pilot sequence from the electronic device 4. When the communication system comprises several electronic devices (such as the electronic device 4) as contemplated hereinabove, several pilot sequences orthogonal to each other can be transmitted simultaneously to the communication unit 2, the communication unit 2 being then able to separate the different pilot sequences received within the received signals (thanks to the above-mentioned orthogonal nature) and to process separately each pilot sequence received as described now for a pilot sequence.

The pilot sequence is received by the communication unit 2 via each of the antennas $A_1$, $A_i$, $A_j$, $A_N$ of the array of antennas 8 in such a way that the control unit 6 can determine at step E8 noisy values $\xi_1$, $\xi_i$, $\xi_j$, $\xi_N$ respectively representative of the transmission through the different communication channels $C_1$, $C_i$, $C_j$, $C_N$ (the determination of a noisy value $\xi_i$ representative of the transmission through a communication channel $C_i$ being made by processing of the pilot sequence received via the antenna $A_i$ defining this communication channel $C_i$).

The method then continues with a step E10 of applying, as an input of the artificial neural network 20, a vector x determined as a function of the noisy function $\xi_1$, $\xi_i$, $\xi_j$, $\xi_N$. This step E10 is here implemented by the application module 14.

According to the first embodiment contemplated (already mentioned hereinabove), the vector x is formed of said noisy values $\xi_1$, $\xi_i$, $\xi_j$, $\xi_N$ (that is to say that each coefficient or element xi of the vector x is one of the noisy values $\xi_1$, $\xi_i$, $\xi_j$, $\xi_N$) We have for example in this case: $x_i=\xi_i$.

According to the second embodiment contemplated (already mentioned hereinabove), the vector x is obtained by normalization and application of a transformation of the noisy values $\xi_1$, $\xi_i$, $\xi_j$, $\xi_N$ respectively associated with the antennas $A_1$, $A_i$, $A_j$, $A_N$ of the array of antennas 8 in the dual angular domain (by multiplication by the already-mentioned transform matrix F). In other words:

$$x = \frac{1}{\sqrt{\sum_{i=1}^{N}|\xi i|^2}} \cdot F \begin{pmatrix} \xi_1 \\ \vdots \\ \xi_i \\ \vdots \\ \xi_j \\ \vdots \\ \xi_N \end{pmatrix}$$

where F is the already-mentioned transform matrix.

The artificial neural network 20 then produces as an output, at step E12, a vector $\hat{h}$ comprising the searched estimated values, respectively representative of the transmission through the communication channels $C_1$, $C_i$, $C_j$, $C_N$.

These estimated values can be used by the communication unit 6 to configure circuits for processing the electromagnetic signals received by the antennas $A_1$, $A_i$, $A_j$, $A_N$ of the array of antennas 8 (these processing circuits being included in the communication unit 6 but not shown so as to simplify the disclosure). These estimated values can also be estimated to configure pre-encoders adapted to perform a pre-encoding of the electromagnetic signals to be transmitted by means of the antennas $A_i$, $A_i$, $A_i$, $A_N$ of the array of antennas 8 (when these antennas also operate in transmission as mentioned hereinabove).

It can be observed that, in the second contemplated embodiment (mentioned hereinabove), the transformation from the antenna domain to the dual angular domain (that is to say the multiplication by the matrix F) is performed in the initialization step E4 and in the application step E10, so that we effectively find as an output of the artificial neural network 20 the searched estimation h (due to the fact that $F^H F=Id$, where Id is the identity matrix), without having to proceed to an inverse transformation.

The method then comprises a step E14 of updating the weighting coefficients of the artificial neural network 20 (that is to say the elements of the matrix W) by means of a learning technique making it possible to reduce the cost function f that, as already indicated, increases as a function of the distance d between the vector x applied as an input of the artificial neural network 20 and the vector $\hat{h}$ produced as an output of the artificial neural network 20. This is thus a step of optimizing the coefficients (or elements) of the matrix W in such a way that the cost function f decreases.

As already indicated, when the vectors $b_1$ and/or $b_2$ are used within the artificial neural network 20, the elements of these vectors $b_1$, $b_2$ can be simultaneously updated during step E14.

This step E14 is here implemented by the updating module 16.

The artificial neural network 20 (that is to say in practice the matrix W) will thus give a refined estimation of the values representatives of the transmission through the communication channels $C_1$, $C_i$, $C_j$, $C_N$ during futures applications of a vector x as an input of the artificial neural network 20.

The method can indeed loop to step E6 as shown in FIG. 4 to process another pilot sequence.

FIG. 5 schematically shows a possible alternative for the artificial neural network 20.

This alternative is based on the taking into account of several paths (here K paths) for the different communication channels $C_1$, $C_i$, $C_j$, $C_N$ in such a way that the vector comprising the values representatives of the transmission through the different communication channels $C_1$, $C_i$, $C_j$, $C_N$ can be written:

$$\sum_{k=1}^{K} \beta_k e(\theta_k)$$

where $\beta_k$ and $\theta_k$ are respectively a gain and an azimuth angle associated with a particular path.

Reference may be made for example for that purpose to the article "*Matching pursuits with time-frequency dictionaries*", by S. Mallat and Z. Zhang, in IEEE Transactions on Signal Processing, vol. 41, n °12, pp. 3397-3415, dec. 1993.

As can be seen in FIG. 5, the artificial neural network making it possible to perform the channel estimation in this context comprises K parts $P_1$, $P_2$, $P_k$, . . . , $P_K$ each made as shown in FIG. 6.

Each part $P_k$ of the artificial neural network comprises columns of weighting coefficients and is configured to determine (among these columns of weighting coefficients) the column of weighting coefficients that is the best correlated with a vector $r_{k-1}$ received as an input of this part $P_k$ of the artificial neural network and to produce a vector that is colinear with the best correlated column.

For that purpose, each part $P_k$ of the artificial neural network has a structure of the same type as that of FIG. 3, as explained hereinafter. It is to be noted in this respect that the columns of weighting coefficients used (which form the matrix W as already indicated) are the same in the different parts $P_k$ of the artificial neural network. In other words, as explained hereinafter, the same matrix W is used in the different parts $P_k$ of the artificial neural network. However, as an alternative, the columns of weighting coefficients used could be specific to each part $P_k$ of the artificial neural network (being potentially initialized by the same columns for the different parts $P_k$ as described hereinabove in step E4, but possibly evolving differently during the learning phase).

Each part $P_k$ hence comprises here:

- a first layer 32 designed to apply to the vector $r_{k-1}$ received as an input of the part $P_k$ a multiplication (on the left) by the matrix $W^H$ (this first layer 32 hence being in the present example identical to the first layer 22 described hereinabove);
- a second layer 34 designed to keep only the element (or coefficient) of greatest module in the vector received from the first layer 32 (that is to say the vector $W^H r_{k-1}$) and to cancel all the other elements of this same vector (this second layer 34 hence being in the present example identical to the second layer 24 described hereinabove);
- a third layer 36 designed to apply to the vector received from the second layer 34 a multiplication (on the left) by the matrix W and to thus produce as an output a vector that is colinear with the column of weighting coefficients that is the best correlated with the vector $r_{k-1}$ received as an input of the part $P_k$ (this third layer 36 hence being in the present example identical to the third layer 26 described hereinabove).

The first, second and third layers 32, 34, 36 being here respectively identical to the first, second and third layers 22, 24, 26 described hereinabove with reference to FIG. 3, reference may be made to the description of FIG. 3 for any other detail relating to the first, second and third layers 32, 34, 36, in particular as regards the use of vectors $b_1$ and/or $b_2$.

Each part $P_k$ of the artificial neural network is moreover designed to produce as an output a vector $r_k$ equal to the difference between the vector $r_{k-1}$ received as an input of the concerned part $P_k$ and the above-mentioned colinear vector (produced as an output of the third layer 36), here thanks to a combination element 38 visible in FIG. 6.

As can be seen in FIG. 5, the vector x received as an input of the artificial neural network is applied as an input of the (first) part $P_1$ of the artificial neural network. In other words, with the above notations, we have: $r_0=x$.

Each vector $r_k$ produced as an output of a part $P_k$ of the artificial neural network is moreover applied as an input of the following part $P_{k+1}$ (for k from 1 to K−1).

Finally, the vector $r_k$ produced as an output of the (last) part $P_K$ of the artificial neural network is subtracted from the vector x received as an input of the artificial neural network (here by means of a combination element 40) in such a way as to obtain the vector $\hat{h}$ comprising the estimated values respectively representative of the transmission through the communication channels $C_1$, $C_i$, $C_j$, $C_N$. In other words, we have: $\hat{h}=x-r_k$.

In the different embodiments described hereinabove, the invention makes it possible to obtain a channel estimation in accordance with the physical model from the beginning of the operation of the channel estimation device, then a channel estimation closer and closer to the real system thanks to the learning of the artificial neural network 20.

The invention hence first allows correcting a physical model (necessarily imperfect), whether the imperfection is due to simplifying assumptions or to a partial knowledge of the system of antennas (position and gain of the antennas, directivity of the antennas, coupling between antennas, etc.).

The invention also allows adapting the estimation processing performed by the communication unit (here, a base station) to changes in the distribution of the channels (here in the concerned cell of the mobile phone network). For example, if the cell environment changes, due to the fact that a new building is being constructed, that trees are losing their leaves or that a bus is parked in the close environment of the base station, then the coefficients of the artificial neural network will be adapted automatically and in real time to these changes.

The invention moreover allows detecting and correcting the potential damages of the communication unit (here of the base station). For example, if during the intervention of a technician or due to bad weather, one or several antennas see their gain changed (or even cancelled, in which case the concerned antennas are out of service), then the value of the cost function used by the artificial neural network will suddenly increase, which will allow detecting the incident, then the incremental learning will allow an automatic correction of the coefficients of the artificial neural network to adapt to this new configuration.

The invention has finally an indirect interest for antenna builders. Indeed, knowing in advance that the communication unit (for example, a base station) will be able to correct itself a physical model allows relaxing the accuracy constraints when building the antennas. It is no longer needed to calibrate accurately the positions and gains of the antennas a priori because this may be made a posteriori at the time of use of the antennas by the communication unit (here the base station), which performs a sort of self-calibration of its antenna system.

The invention claimed is:

1. A method for estimating a channel in a communication system including a plurality of communication channels from a plurality of noisy values respectively representative of transmission through said communication channels, the method comprising:

based on a physical model of the communication system, the physical model being based on at least one parameter, constructing a set of vectors respectively associated with a plurality of values of said at least one parameter, one of the vectors that is associated with a specific value of said at least one parameter comprising values respectively representative of the transmission through said communication channels according to said physical model for said specific value of said at least one parameter;

initializing, as a function of the constructed set of vectors, columns of weighting coefficients defining at least a part of an artificial neural network, said part of the artificial neural network being configured to determine one of the columns of weighting coefficients that is most correlated with an input vector received as an input of the artificial neural network and to produce as an output an output vector that is colinear with the most correlated column;

determining the input vector as a function of said noisy values;

applying, as an input of said part of the artificial neural network, the input vector to produce the output vector as an output of the artificial neural network, the output vector comprising estimated values respectively representative of the transmission through said communication channels; and updating the weighting coefficients of said part of the artificial neural network by a learning technique reducing a cost function that increases as a function of a distance between the input vector applied as the input of the artificial neural network and the output vector produced as the output of the artificial neural network.

2. The channel estimation method according to claim 1, further comprising successively applying the input vector as a successive input of said part of artificial neural network, and for each successive application of the input vector as the successive input, updating the weighting coefficients by said learning technique.

3. The channel estimation method according to claim 1, wherein, at the initializing, each of the columns of weighting coefficients is initialized with a vector product of a transform matrix for transformation from a domain of the communication channels to a dual angular domain, with one of the vectors of said set of vectors.

4. The channel estimation method according to claim 3, wherein the input vector applied as the input of the artificial neural network is obtained by normalizing an initial vector comprising said noisy values and multiplying the transform matrix by the normalized initial vector.

5. The channel estimation method according to claim 1, wherein, at the initializing, each of the columns of weighting coefficients is initialized with a respective vector of said constructed set of vectors, and wherein the input vector comprises said noisy values.

6. The channel estimation method according to claim 1, wherein the artificial neural network comprises at least another part configured to receive as an input another input vector obtained by a difference between the input vector applied as the input of said part of the artificial neural network and the output vector produced as the output of said part of the artificial neural network, the other part of the artificial neural network comprising columns of other weighting coefficients and being configured to determine the column of said other weighting coefficients that is most correlated with the other input vector received as an input of the other part of the artificial neural network and to produce another output vector that is colinear with the most correlated column of said other coefficients.

7. The channel estimation method according to claim 1, wherein the at least one parameter comprises a plurality of parameters, and wherein the constructed set of vectors comprises vectors respectively associated with a plurality of distinct tuples of values of said parameters.

8. A method for estimating a channel in a communication system including a plurality of communication channels from a plurality of noisy values respectively representative of transmission through said communication channels, the method comprising:

based on a physical model of the communication system having at least one parameter, constructing a set of vectors associated with a plurality of values of said at least one parameter, one of the vectors that is associated with a specific value of said at least one parameter comprising values respectively representative of the transmission through said communication channels according to said physical model for said specific value of said at least one parameter;

initializing, as a function of the constructed set of vectors, columns of weighting coefficients defining at least a part of an artificial neural network, said part of the artificial neural network being configured to determine one of the columns of weighting coefficients that is most correlated with an input vector received as an input of the artificial neural network and to produce as an output an output vector that is colinear with the most correlated column;

determining the input vector as a function of said noisy values;

applying, as an input of said part of the artificial neural network, the input vector to produce the output vector as an output of the artificial neural network, the output vector comprising estimated values respectively representative of the transmission through said communication channels; and updating the weighting coefficients of said part of the artificial neural network by a learning technique reducing a cost function that increases as a function of a distance between the input vector applied as the input of the artificial neural network and the output vector produced as the output of the artificial neural network, wherein the parameter is an angle with respect to an array of antennas of the communication system, and wherein the constructed set of vectors comprises at least one value representative of the transmission and obtained as a function of a value of said angle.

9. The channel estimation method according to claim 1, wherein said noisy values are obtained by receiving pilot sequences via the communication channels and processing of said received pilot sequences.

10. A channel estimation device for a communication system including a plurality of communication channels, the channel estimation device comprising:

one or more processors configured to:

construct, based on a physical model of the communication system, the physical model being based on at least one parameter, a set of vectors respectively associated with a plurality of values of said at least one parameter such that one of the vectors that is associated with a specific value of said at least one parameter comprises values respectively representative of transmission through said communication channels according to said physical model for said specific value of said at least one parameter, initialize, as a function of the constructed set of vectors, columns of weighting coefficients defining at least a part of an artificial neural network, said part of the artificial neural network being configured to determine one of the columns of weighting coefficients that is most correlated with an input vector received at an input of the artificial neural network and to produce as an output an output vector that is colinear with the most correlated column, apply, as an input of said part of the artificial neural network, the input vector determined as a function of noisy values respectively representative of the transmission through said communication channels, to produce the output vector as an output of the artificial neural network, the output vector comprising estimated values respectively representative of the transmission through said communication channels, and update the weighting coefficients of said part of the artificial neural network by a learning technique reducing a cost function that increases as a function of a distance between the input vector applied as the input of the artificial neural network and the output vector produced as the output of the artificial neural network.

11. A non-transitory computer-readable medium on which is stored a computer program comprising instructions executable by a processor and configured to implement the method according to claim 1 when the instructions are executed by the processor.

12. The channel estimation method according to claim 2, wherein, at the initializing, each of the columns of weighting coefficients is initialized with a vector product of a transform matrix for transformation from a domain of the respective communication channels to a dual angular domain, with one of the vectors of said set of vectors.

13. The channel estimation method according to claim 2, wherein, at the initializing, each of the columns of weighting coefficients is initialized with a respective vector of said constructed set of vectors, and wherein the input vector comprises said noisy values.

14. The channel estimation method according to claim 2, wherein the artificial neural network comprises at least another part configured to receive as an input another input vector obtained by a difference between the input vector applied as the input of said part of the artificial neural network and the output vector produced as the output of said part of the artificial neural network, the other part of the artificial neural network comprising columns of other weighting coefficients and being configured to determine the column of said other weighting coefficients that is most correlated with the other input vector received as an input of the other part of the artificial neural network and to produce another output vector that is colinear with the most correlated column of said other coefficients.

15. The channel estimation method according to claim 2, wherein said physical model is based on a plurality of parameters, and wherein the constructed set of vectors comprises vectors respectively associated with a plurality of distinct tuples of values of said parameters.

16. The channel estimation method according to claim 2, wherein the parameter is an angle with respect to an array of antennas of the communication system, and wherein the constructed set of vectors comprises at least one value representative of the transmission and obtained as a function of a value of said angle.

17. The channel estimation method according to claim 2, wherein said noisy values are obtained by receiving pilot sequences via the communication channels and processing of said received pilot sequences.

* * * * *